US010822962B2

(12) United States Patent
Vu et al.

(10) Patent No.: US 10,822,962 B2
(45) Date of Patent: Nov. 3, 2020

(54) VANE PLATFORM LEADING EDGE RECESSED POCKET WITH COVER

(71) Applicant: United Technologies Corporation, Farmington, CT (US)

(72) Inventors: Ky H. Vu, East Hartford, CT (US); Adam P. Generale, Dobbs Ferry, NY (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 30 days.

(21) Appl. No.: 16/144,677

(22) Filed: Sep. 27, 2018

(65) Prior Publication Data

US 2020/0102838 A1    Apr. 2, 2020

(51) Int. Cl.
| | | |
|---|---|---|
| *F01D 5/18* | (2006.01) | |
| *F01D 5/30* | (2006.01) | |
| *F01D 9/04* | (2006.01) | |
| *F01D 9/06* | (2006.01) | |

(52) U.S. Cl.
CPC ............... *F01D 5/187* (2013.01); *F01D 5/30* (2013.01); *F01D 9/041* (2013.01); *F01D 9/065* (2013.01); *F05D 2240/121* (2013.01); *F05D 2240/122* (2013.01); *F05D 2240/81* (2013.01); *F05D 2260/201* (2013.01); *F05D 2260/2212* (2013.01); *F05D 2260/22141* (2013.01); *F05D 2260/40311* (2013.01)

(58) Field of Classification Search
CPC .......... F01D 9/065; F01D 5/186; F01D 5/187; F01D 5/188; F05D 2240/81; F05D 2260/20; F05D 2260/201; F05D 2260/202; F05D 2260/2212; F05D 2260/22141; F05D 2240/121
See application file for complete search history.

(56) References Cited

U.S. PATENT DOCUMENTS

| | | | | | |
|---|---|---|---|---|---|
| 3,628,880 | A | * | 12/1971 | Smuland ................. | F01D 5/189 415/175 |
| 4,693,667 | A | * | 9/1987 | Lenz ....................... | F01D 5/189 415/115 |
| 4,712,979 | A | * | 12/1987 | Finger ..................... | F01D 5/081 416/96 R |

(Continued)

FOREIGN PATENT DOCUMENTS

EP            3273002           1/2018

OTHER PUBLICATIONS

European Patent Office, European Search Report dated Jan. 7, 2020 in Application No. 19188144.0.

*Primary Examiner* — Christopher Verdier
(74) *Attorney, Agent, or Firm* — Snell & Wilmer LLP

(57) ABSTRACT

A platform for an airfoil of a gas turbine engine having an axis extending from a front of the gas turbine engine to a rear of the gas turbine engine. The platform includes a leading edge configured to face towards the front of the gas turbine engine. The platform further includes a trailing edge opposite the leading edge. The platform further includes a radially outer surface that defines a pocket for receiving a cooling airflow. The platform further includes a cover coupled to the radially outer surface to at least partially enclose the pocket and defining a plurality of air inlet holes configured to port at least a portion of the cooling airflow into the pocket.

18 Claims, 5 Drawing Sheets

(56) References Cited

U.S. PATENT DOCUMENTS

| | | | |
|---|---|---|---|
| 5,252,026 A | 10/1993 | Shepherd | |
| 5,429,478 A * | 7/1995 | Krizan et al. | |
| 7,921,654 B1 * | 4/2011 | Liang | F01D 5/186 60/806 |
| 8,790,073 B2 | 7/2014 | Mugglestone | |
| 9,638,047 B1 | 5/2017 | Jones | |
| 2008/0089787 A1 * | 4/2008 | Abdel-Messeh | F01D 5/187 416/179 |
| 2012/0020768 A1 * | 1/2012 | Krueckels | F01D 5/187 415/1 |
| 2012/0163975 A1 | 6/2012 | Propheter-Hinckley | |
| 2012/0177479 A1 | 7/2012 | Azad et al. | |
| 2014/0116065 A1 | 5/2014 | Sandelis et al. | |
| 2017/0044906 A1 * | 2/2017 | Mongillo | F01D 5/188 |
| 2018/0230836 A1 * | 8/2018 | Tibbott | F01D 9/065 |

\* cited by examiner

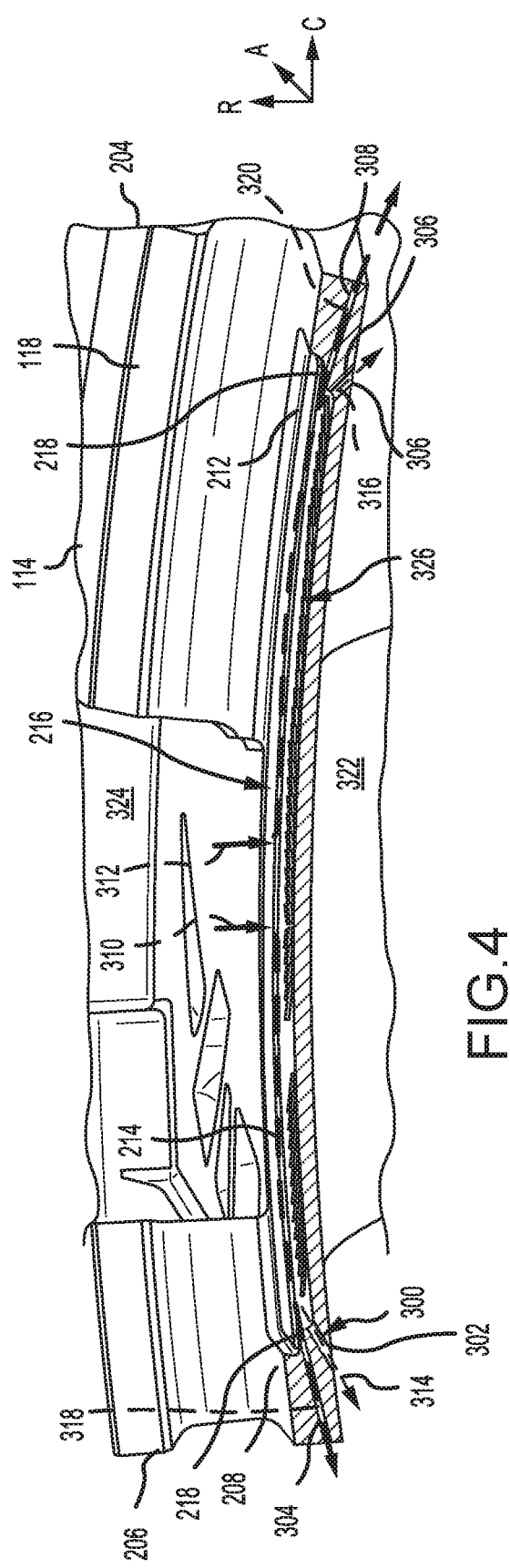
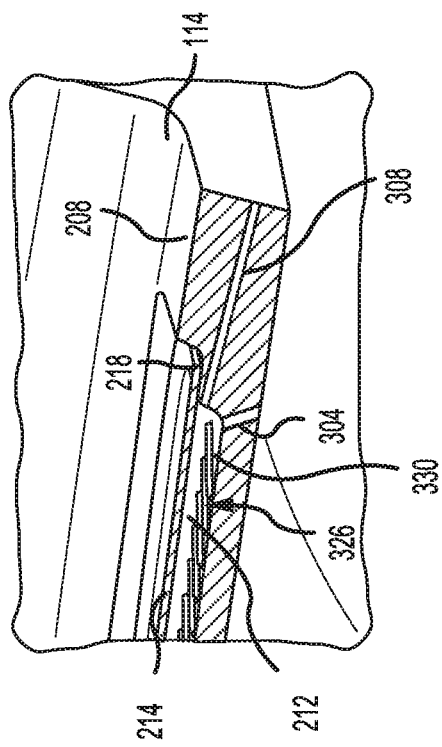
FIG. 4
FIG. 5

VANE PLATFORM LEADING EDGE RECESSED POCKET WITH COVER

GOVERNMENT LICENSE RIGHTS

This invention was made with Government support awarded by the United States. The Government has certain rights in this invention.

FIELD

The present disclosure relates generally to gas turbine engines and, more particularly, to platforms of vanes that are designed to include cooling features for reducing a temperature of a leading edge of the platforms.

BACKGROUND

Gas turbine engines include compressor sections to compress air, combustor sections that combine the airflow with fuel to facilitate combustion and generate exhaust, and turbine sections that convert the exhaust into torque to drive the compressor sections. The turbine sections may include rotating turbine blades and stationary vane assemblies. The vane assemblies include inner and outer diameter platforms and vanes between the platforms. The vanes may turn the exhaust in a desirable direction. Due to the turbine sections receiving the exhaust from the combustor sections, components in the turbine section may be exposed to relatively high temperatures. Therefore, it is desirable to control the temperature of components used in the turbine section, including the vane assemblies, in order to increase a lifespan of such components.

SUMMARY

Described herein is a platform for an airfoil of a gas turbine engine having an axis extending from a front of the gas turbine engine to a rear of the gas turbine engine. The platform includes a leading edge configured to face towards the front of the gas turbine engine. The platform further includes a trailing edge opposite the leading edge. The platform further includes a radially outer surface that defines a pocket for receiving a cooling airflow. The platform further includes a cover coupled to the radially outer surface to at least partially enclose the pocket and defining a plurality of air inlet holes configured to port at least a portion of the cooling airflow into the pocket.

In any of the foregoing embodiments, the cover further defines a plurality of air exit holes configured to port the at least the portion of the cooling airflow out of the pocket.

Any of the foregoing embodiments may further include a first circumferential edge; and a second circumferential edge, wherein the cover extends in a direction from the first circumferential edge to the second circumferential edge.

In any of the foregoing embodiments, the plurality of air exit holes includes a first air exit hole and a second air exit hole that is located nearer to the first circumferential edge than the first air exit hole; and the plurality of air inlet holes are located between the first air exit hole and the second air exit hole.

In any of the foregoing embodiments, the cooling airflow is received by the plurality of air inlet holes and flows circumferentially through the pocket towards the first air exit hole and the second air exit hole.

In any of the foregoing embodiments, the radially outer surface defines a recessed shelf configured to be coupled to the cover.

In any of the foregoing embodiments, a pocket portion of the radially outer surface that is located within the pocket defines cooling features to increase a surface area of the pocket portion and to augment turbulence in a near wall region in order to increase heat rejection by the radially outer surface.

In any of the foregoing embodiments, the cooling features include raised bars.

In any of the foregoing embodiments, the cover is welded to the recessed shelf of the radially outer surface.

Any of the foregoing embodiments may further include a forward hook and an aft hook that is located closer to the rear of the gas turbine engine than the forward hook, the forward hook and the aft hook configured to interface with case hooks of a case of the gas turbine engine, wherein the pocket is located forward of the forward hook.

In any of the foregoing embodiments, the platform is configured for use as an outer diameter platform of a vane of a turbine section of the gas turbine engine.

Also disclosed is a vane assembly for use in a gas turbine engine having an axis extending from a front of the gas turbine engine to a rear of the gas turbine engine. The vane assembly includes a vane. The vane assembly further includes a platform coupled to the vane and configured to support the vane. The platform includes a leading edge configured to face towards the front of the gas turbine engine. The platform further includes a trailing edge opposite the leading edge. The platform further includes a radially outer surface that defines a pocket for receiving a cooling airflow. The platform further includes a cover coupled to the radially outer surface to at least partially enclose the pocket and defining a plurality of air inlet holes configured to port at least a portion of the cooling airflow into the pocket.

In any of the foregoing embodiments, the platform further includes a first circumferential edge and a second circumferential edge opposite the first circumferential edge; the cover extends in a direction from the first circumferential edge to the second circumferential edge; and the cover further defines a plurality of air exit holes configured to port the at least the portion of the cooling airflow out of the pocket.

In any of the foregoing embodiments, the plurality of air exit holes includes a first air exit hole and a second air exit hole that is located nearer to the first circumferential edge than the first air exit hole; and the plurality of air inlet holes are located between the first air exit hole and the second air exit hole.

In any of the foregoing embodiments, the cooling airflow is received by the plurality of air inlet holes and flows circumferentially through the pocket towards the first air exit hole and the second air exit hole.

In any of the foregoing embodiments, the radially outer surface defines an outer surface and a recessed shelf extending radially inward from the outer surface and configured to be coupled to the cover.

In any of the foregoing embodiments, a pocket portion of the radially outer surface that is located within the pocket defines a plurality of cooling features to increase a surface area of the pocket portion and to augment turbulence in a near wall region in order to increase heat rejection by the radially outer surface.

In any of the foregoing embodiments, the platform further includes a forward hook and an aft hook that is located closer to the rear of the gas turbine engine than the forward hook, the forward hook and the aft hook configured to interface with case hooks of a case of the gas turbine engine, wherein the pocket is located forward of the forward hook.

Also disclosed is a gas turbine engine having a front, a back, and an axis extending from the front to the back. The gas turbine engine includes a compressor section configured to output a compressed gas. The gas turbine engine further includes a combustor section configured to receive the compressed gas and fuel, mix the compressed gas and the fuel into a mixture, and to ignite the mixture to generate exhaust. The gas turbine engine further includes a turbine section configured to convert the exhaust into torque to drive the compressor section, the turbine section including a vane assembly. The vane assembly includes a vane. The vane assembly further includes a platform coupled to the vane and configured to support the vane. The platform includes a leading edge configured to face towards the front of the gas turbine engine. The platform further includes a trailing edge opposite the leading edge. The platform further includes a radially outer surface that defines a pocket for receiving a cooling airflow. The platform further includes a cover coupled to the radially outer surface to at least partially enclose the pocket and defining a plurality of air inlet holes configured to port at least a portion of the cooling airflow into the pocket.

In any of the foregoing embodiments, the platform further includes a first circumferential edge and a second circumferential edge opposite the first circumferential edge; the cover extends in a direction from the first circumferential edge to the second circumferential edge; the cover further defines a plurality of air exit holes configured to port the at least the portion of the cooling airflow out of the pocket; the plurality of air exit holes includes a first air exit hole and a second air exit hole that is located nearer to the first circumferential edge than the first air exit hole; and the plurality of air inlet holes are located between the first air exit hole and the second air exit hole.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

FIG. 4 is a cross-sectional view of the outer diameter platform of FIG. 3, in accordance with various embodiments;

FIG. 5 is a perspective view of a portion of the outer diameter platform of FIG. 3, in accordance with various embodiments.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B."

Figure 1:
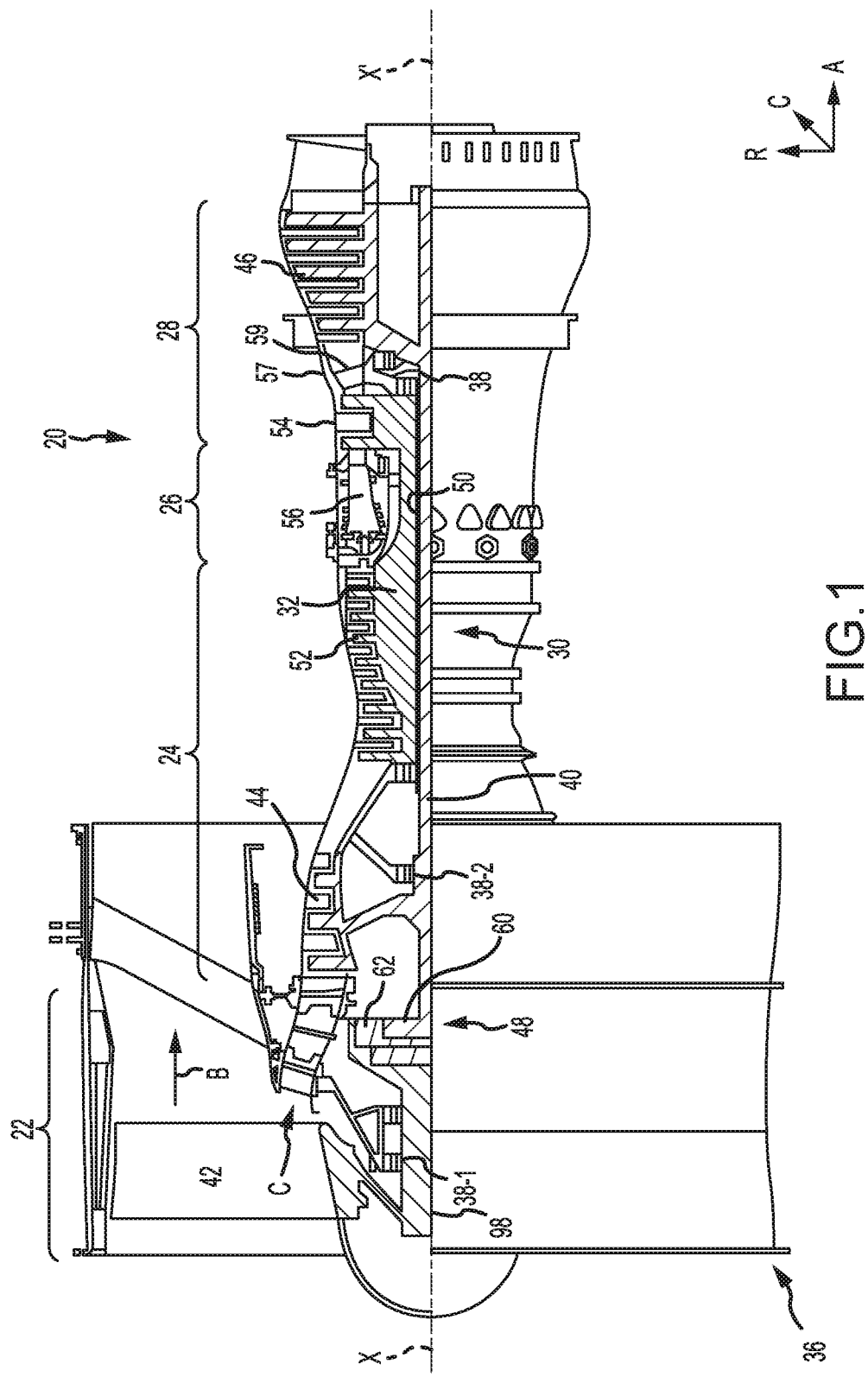
FIG. 1 is a cross-sectional view of an exemplary gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

The gas turbine engine 20 may be a two-spool turbofan that generally incorporates a fan section 22, a compressor section 24, a combustor section 26 and a turbine section 28. In operation, the fan section 22 drives air along a bypass flow-path B while the compressor section 24 drives air along a core flow-path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures and turboshaft or industrial gas turbines with one or more spools.

The gas turbine engine 20 generally comprises a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear housing 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by the low pressure compressor section 44 then the high pressure compressor 52, mixed and burned with fuel in the combustor 56, then expanded over the high pressure turbine 54 and the low pressure turbine 46. The mid-turbine frame 57 includes airfoils 59 which are in the core airflow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6:1). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 2:
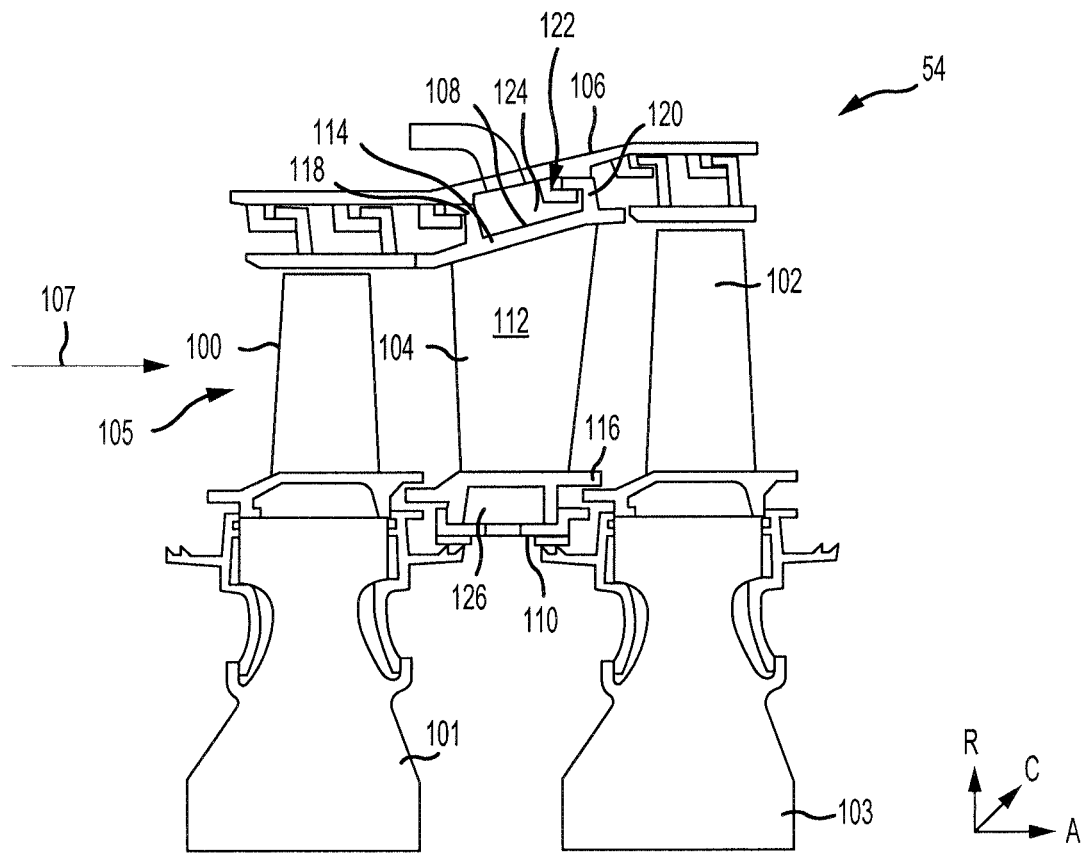
FIG. 2 is a cross-sectional view of a portion of a high pressure turbine section of the gas turbine engine of FIG. 1, in accordance with various embodiments.

Referring now to FIGS. 1 and 2, the high pressure turbine section 54 may include multiple airfoils 105 including multiple rows, or stages, of blades including a first blade 100 and a second blade 102, along with rows, or stages, of vane assemblies located therebetween including a vane assembly 104. The blades 100, 102 may be coupled to discs 101, 103 respectively which facilitate rotation of the blades 100, 102 about the axis X-X' in response to receiving exhaust from the combustor section 56. This exhaust may be referred to as the gas path and may travel aftward, as shown by an arrow 107. The vane assembly 104 may be coupled to a case 106 and may remain stationary relative to the axis X-X' (i.e., the vane assembly 104 may fail to rotate about the axis X-X'). The vane assembly 104 may turn the exhaust so that it has a desirable orientation in response to the exhaust being received by the blade 102.

The vane assembly 104 may include an outer diameter edge 108 and an inner diameter edge 110. Due to relatively high temperatures within the high pressure turbine section 54, it may be desirable for the blade 102 (and the vane assembly 104) to receive a flow of cooling air. Where used in this context, cooling air may include any gas having a temperature less than that of ambient air or gas in the specific environment. In that regard, the vane assembly 104 may receive a cooling airflow from the outer diameter edge 108 or the inner diameter edge 110. The vane assembly 104 may define air passages that transport the cooling airflow through the vane assembly 104 to the other of the outer diameter edge 108 or the inner diameter edge 110. For example, the cooling airflow may be received by an outer diameter cavity 124, travel through the outer diameter platform 114, the vane 112, and the inner diameter platform 116 to an inner diameter cavity 126.

The vane assembly 104 may include a vane 112 (i.e., an airfoil designed to turn a gas) and platforms 114, 116. The platforms 114, 116 may include an outer diameter platform 114 and an inner diameter platform 116. The vane assembly 104 may further include a forward hook 118 and an aft hook 120 located aft of the forward hook 118. The hooks 118, 120 of the vane assembly 104 may interface with case hooks 122 of the case 106 to couple the outer diameter platform 114 to the case 106.

Figure 3:
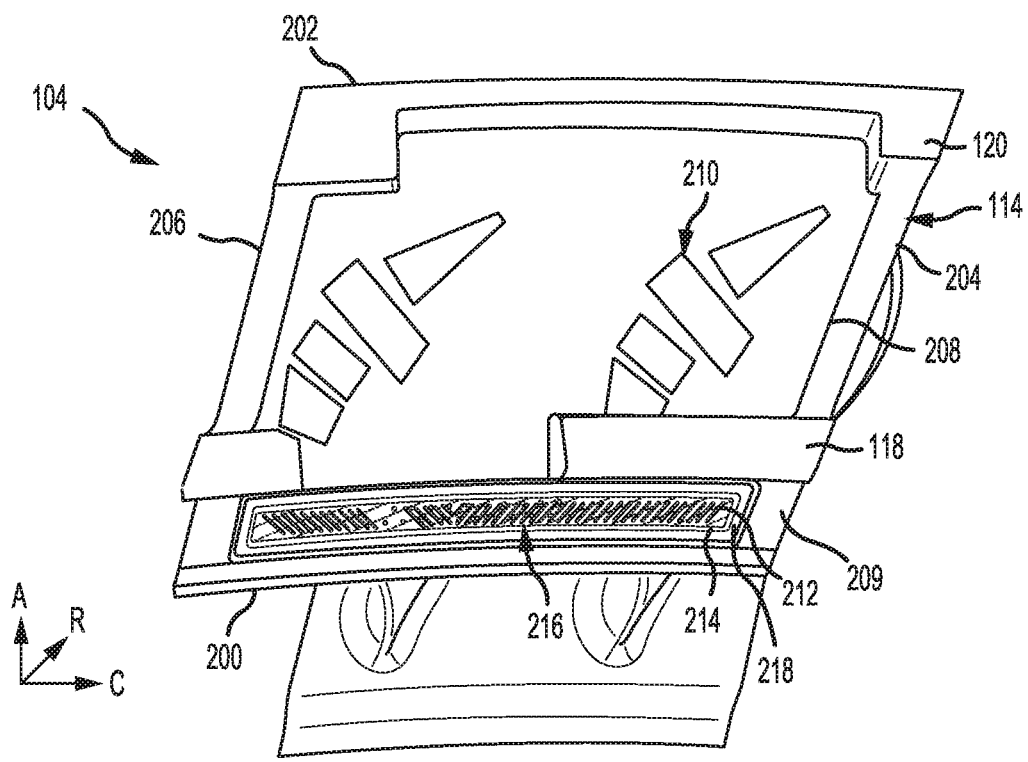
FIG. 3 is a radial view of an outer diameter platform of a vane assembly of the high pressure turbine section of FIG. 2, in accordance with various embodiments.

Referring now to FIG. 3, the outer diameter platform 114 may have a leading edge 200 that faces towards a front of the gas turbine engine 20 of FIG. 1 and a trailing edge 202 opposite the leading edge 200 (and that faces towards a rear of the gas turbine engine 20 of FIG. 1). The outer diameter platform 114 may further include a first circumferential edge 204 and a second circumferential edge 206. The leading edge 200 and the trailing edge 202 extend from the first circumferential edge 204 to the second circumferential edge 206. Furthermore, the circumferential edges 204, 206 may be facing a circumferential direction relative to the axis X-X' of FIG. 1. The outer diameter platform 114 may further include a radially outer surface 208 that faces radially outward.

In various embodiments and with brief reference to FIGS. 2 and 3, the inner diameter platform 116 may have similar features as the outer diameter platform 114. For example, the inner diameter platform 116 may include a leading edge, a trailing edge, two circumferential edges, and a radially inner surface that acts in a similar manner as the radially outer surface 208 of the outer diameter platform 114. Although the present disclosure describes cooling features implemented in an outer diameter platform of a vane of a turbine section of a gas turbine engine, one skilled in the art will realize that the contents of the present disclosure are equally applicable to any inner diameter or outer diameter platform that supports an airfoil.

The radially outer surface 208 may define one or more vane internal cavity 210. The vane internal cavities 210 may receive a cooling airflow (which may be directed into a volume radially outward from the radially outer surface 208). The cooling airflow may travel through the outer diameter platform 114, through cooling channels of the vane 112, and through the inner diameter platform 116. In various embodiments, cooling airflow may instead travel first through the inner diameter platform 116, then through the vane 112, and finally through the outer diameter platform 114. The contents of the present disclosure are equally applicable to either configuration.

In various embodiments, the vane assembly 104 may be exposed to relatively high temperatures. In that regard, it is desirable to cool the components of the vane assembly 104. For example, the leading edge 200 of the outer diameter platform 114 may be exposed to relatively great temperatures. This exposure may be undesirable as it may result in degradation, wear and tear, or the like on the components of the vane assembly 104. In that regard, the outer diameter platform 114 is designed with features to cool a general region near the leading edge 200. In various embodiments, the inner diameter platform 116 may include similar features as the outer diameter platform 114.

Returning reference to FIG. 3, the radially outer surface 208 of the outer diameter platform 114 may define a pocket 212. The pocket 212 may be designed to receive cooling air from the volume radially outward from the radially outer surface 208 of the outer diameter platform 114 and to port the cooling air through the pocket 212. The pocket 212 may be located towards a front of the outer diameter platform 114 (i.e, proximate to the leading edge 200). The pocket 212 may be formed by an outer surface 209 of the radially outer surface 208 extending radially inward at the pocket 212. Additionally, the radially outer surface 208 may define a recessed shelf 218 that extends radially inward from the outer surface 209. In various embodiments, the recessed shelf 218 may extend radially inward by a lesser amount than the pocket 212.

The vane assembly 104 may include a cover 214 that encloses the pocket 212. The cover 214 may define or include a plurality of air inlet holes 216. The air inlet holes 216 may be located towards a center of the cover 214 (i.e., the center being a longitudinal center with the longitudinal direction extending from the first circumferential edge 204 to the second circumferential edge 206). In various embodiments, the air inlet holes 216 may include any quantity of holes that extend through the cover 214. For example, the air inlet holes 216 may include a single row of one to twenty or more holes, two rows of one to twenty or more holes each, two rows with ten holes (as shown), or the like.

The pocket 212 may be located axially forward of the forward hook 118 to provide cooling near the front end, or leading edge 200, of the outer diameter platform 114 where cooling may be most beneficial. The orientation of the pocket 212 may be desirable, with the pocket 212 extending a majority of the distance between the first circumferential edge 204 and the second circumferential edge 206. For example, the pocket 212 may extend for a distance that is 75 percent (75%) of the total distance from the first circumferential edge 204 to the second circumferential edge 206, 85% of the total distance from the first circumferential edge 204 to the second circumferential edge 206, or 95% of the total distance from the first circumferential edge 204 to the second circumferential edge 206.

Referring to FIGS. 3 and 4, the outer diameter platform 114 may define one or more air exit holes 300 configured to port the at least the portion of the cooling airflow out of the pocket. In various embodiments, the air exit holes 300 may port the cooling airflow back into the core airflow of the gas turbine engine 20 of FIG. 1. The air exit holes 300 may be located radially inward from the air inlet holes 216. For example, the air exit holes 300 may be located on edges of the pocket 212 that are nearest the first circumferential edge 204 and the second circumferential edge 206.

The pressure of the cooling air (which may be received from an area 324 radially outward from the radially outer surface 208) may be greater than the pressure of air in the core airflow (which may be located in an area 322 radially inward from the outer diameter platform 114). Due to this pressure differential, the cooling air from the area 324 may be forced into the pocket 212 via the air inlet holes 216. The cooling air may then flow through the pocket 212 towards the air exit holes 300. Due to the placement of the air exit holes 300 near the circumferential edges 204, 206 of the outer diameter platform, the cooling air may travel circumferentially outward from the center of the pocket 212 (where the air inlet holes 216 are located).

In particular, the air exit holes 300 may include a first air exit hole 302 that is located proximate to the second circumferential edge 206, extends through the outer diameter platform 114, and ports the air into the area 322 of the gas path. The air exit holes 300 may further include a second air exit hole 304 that is located proximate to the second circumferential edge 206, extends through the outer diameter platform 114, and ports the cooling air to a location circumferentially between adjacent outer diameter platforms.

The air exit holes 300 may further include a third air exit hole 306 that is located proximate to the first circumferential edge 204, extends through the outer diameter platform 114, and ports the cooling air to the area 322 in the gas path. The air exit holes 300 may further include a fourth air exit hole 308 that is located proximate to the first circumferential edge 204, extends through the outer diameter platform 114, and ports the cooling air to a location circumferentially between adjacent outer diameter platforms.

In various embodiments, air exit holes may be located inline with air inlet holes, and be located equidistant from the circumferential edges 204, 206.

In particular, cooling air or gas may enter the pocket 212 via the air inlet holes 216, as shown by arrows 310, 312. The cooling air or gas may flow circumferentially through the pocket 212 from the air inlet holes 216 towards the air exit holes 300. The cooling air may then flow out of the pocket 212 via the air exit holes 300 as shown by arrows 314, 316, 318, 320. In particular, some of the cooling air may flow out of the first air exit hole 302 as shown by an arrow 314. More mass per unit time of the cooling air may flow out of the second air exit hole 304 as shown by an arrow 318. More mass per unit time of the cooling air may flow out of the third air exit hole 306 as shown by an arrow 316. More of the cooling air may flow out of the fourth air exit hole 308 as shown by an arrow 320.

A pocket portion 330 of the radially outer surface 208 of the outer diameter platform 114 (the pocket portion being located in the pocket 212) may include cooling features 326 within the pocket 212. For example and as shown, the cooling features 326 may include raised bars extending into the pocket 212 from the pocket portion 330 of the radially outer surface 208, thus increasing surface area of the radially outer surface 208 within the pocket 212 and promoting turbulence to augment heat transfer. This increased surface area and turbulence allows for more heat to be transferred away from the outer diameter platform 114 to the cooling airflow that flows through the pocket 212, decreasing the operating temperature of the leading edge 200 of the outer diameter platform 114. In various embodiments, the cooling features 326 may include any other shape that increases the convective heat transfer rate from the wall to the fluid of the radially outer surface 208 within the pocket 212. For example, the cooling features 326 may each have a raised chevron shape, a raised triangle shape, a raised circle shape, a raised wart shape, or the like.

The cooling features 326 may be formed from the same material as the outer diameter platform 114.

The cover 214 may be formed, for example, from sheet metal and may include any material that is capable of bonding to the material of the outer diameter platform 114.

The cover 214 may be welded to the outer diameter platform 114 at the recessed shelf 218. Thus, it may be desirable for the material of the cover 214 to be weldable to the recessed shelf 218. In that regard, the material of the cover 214 may be selected to be a material that bonds relatively easily or relatively well to whichever material is selected for the outer diameter platform 114. Additionally, inclusion of the recessed shelf 218 may improve the ease of assembly of the outer diameter platform 114 because it facilitates alignment of the cover 214 at the desired location on the outer diameter platform 114.

Figure 6:
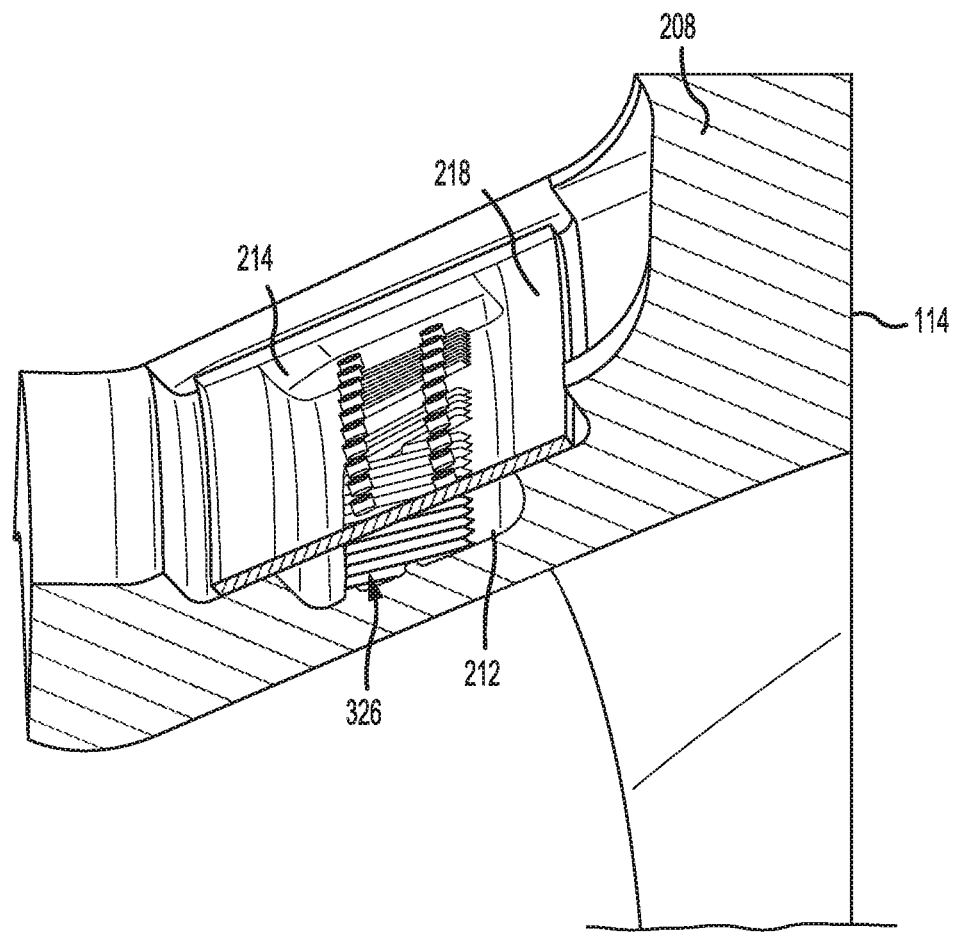
FIG. 6 is a cutaway view of a portion of the outer diameter platform of FIG. 3, in accordance with various embodiments.

Turning now to FIG. 6, a cutaway view of the outer diameter platform 114 illustrates the interface of the cover 214 and the recessed shelf 218. In FIG. 6, the cover 214 is shown to be transparent to illustrate its interface with the recessed shelf 218, and a portion of the cover 214 is not shown to better illustrate the cooling features 326. As shown in FIG. 6, the perimeter of the cover 214 sits on the recessed shelf 218. The perimeter of the cover 214 may then be welded or otherwise coupled to the outer diameter platform 114 at the recessed shelf 218. For example, an adhesive may be used at the recessed shelf 218 to couple the cover 214 to the recessed shelf 218. The cover 214 may enclose the pocket 212 when coupled to the recessed shelf 218.

FIG. 6 also provides an alternative view of the cooling features 326. As shown, the cooling features 326 have a shape similar to a radiator. In that regard, the cooling features 326 increase the surface area of the radially outer surface 208 within the pocket 212, thus increasing an amount of potential heat transfer from the radially outer surface 208 to the cooling air that flows through the pocket 212. They are also oriented at a particular angle relative to the bulk flow direction to induce desirable vortices in the cavity formed by the cover 214 and the pocket 212.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims unless or until the patent application or patent becomes abandoned or expires. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A platform for an airfoil of a gas turbine engine having an axis extending from a front of the gas turbine engine to a rear of the gas turbine engine, the platform comprising:
   a leading edge configured to face towards the front of the gas turbine engine;
   a trailing edge opposite the leading edge;
   a radially outer surface that defines a pocket for receiving a cooling airflow;
   a cover coupled to the radially outer surface to at least partially enclose the pocket and defining a plurality of air inlet holes configured to port at least a portion of the cooling airflow into the pocket; and
   a forward hook and an aft hook that is located closer to the rear of the gas turbine engine than the forward hook, the forward hook and the aft hook configured to interface with case hooks of a case of the gas turbine engine, wherein the pocket is located forward of the forward hook.

2. The platform of claim 1, wherein the platform further defines a plurality of air exit holes configured to port the at least the portion of the cooling airflow out of the pocket.

3. The platform of claim 2, further comprising:
   a first circumferential edge; and
   a second circumferential edge,
   wherein the cover extends in a direction from the first circumferential edge to the second circumferential edge.

4. The platform of claim 3, wherein:
the plurality of air exit holes includes a first air exit hole and a second air exit hole that is located nearer to the first circumferential edge than the first air exit hole; and
the plurality of air inlet holes are located between the first air exit hole and the second air exit hole.

5. The platform of claim 4, wherein the cooling airflow is received by the plurality of air inlet holes and flows circumferentially through the pocket towards the first air exit hole and the second air exit hole.

6. The platform of claim 1, wherein the radially outer surface defines a recessed shelf configured to be coupled to the cover.

7. The platform of claim 6, wherein a pocket portion of the radially outer surface that is located within the pocket defines cooling features to increase a surface area of the pocket portion and to augment turbulence in a near wall region in order to increase heat rejection by the radially outer surface.

8. The platform of claim 7, wherein the cooling features include raised bars.

9. The platform of claim 6, wherein the cover is welded to the recessed shelf of the radially outer surface.

10. The platform of claim 1, wherein the platform is configured for use as an outer diameter platform of a vane of a turbine section of the gas turbine engine.

11. A vane assembly for use in a gas turbine engine having an axis extending from a front of the gas turbine engine to a rear of the gas turbine engine, the vane assembly comprising:
a vane; and
a platform coupled to the vane, configured to support the vane, and having:
a leading edge configured to face towards the front of the gas turbine engine,
a trailing edge opposite the leading edge,
a radially outer surface that defines a pocket for receiving a cooling airflow,
a cover coupled to the radially outer surface to at least partially enclose the pocket and defining a plurality of air inlet holes configured to port at least a portion of the cooling airflow into the pocket, and
a forward hook and an aft hook that is located closer to the rear of the gas turbine engine than the forward hook, the forward hook and the aft hook configured to interface with case hooks of a case of the gas turbine engine, wherein the pocket is located forward of the forward hook.

12. The vane assembly of claim 11, wherein:
the platform further includes a first circumferential edge and a second circumferential edge opposite the first circumferential edge;
the cover extends in a direction from the first circumferential edge to the second circumferential edge; and
the platform further defines a plurality of air exit holes configured to port the at least the portion of the cooling airflow out of the pocket.

13. The vane assembly of claim 12, wherein:
the plurality of air exit holes includes a first air exit hole and a second air exit hole that is located nearer to the first circumferential edge than the first air exit hole; and
the plurality of air inlet holes are located between the first air exit hole and the second air exit hole.

14. The vane assembly of claim 13, wherein the cooling airflow is received by the plurality of air inlet holes and flows circumferentially through the pocket towards the first air exit hole and the second air exit hole.

15. The vane assembly of claim 11, wherein the radially outer surface defines an outer surface and a recessed shelf extending radially inward from the outer surface and configured to be coupled to the cover.

16. The vane assembly of claim 15, wherein a pocket portion of the radially outer surface that is located within the pocket defines a plurality of cooling features to increase a surface area of the pocket portion and to augment turbulence in a near wall region in order to increase heat rejection by the radially outer surface.

17. A gas turbine engine having a front, a back, and an axis extending from the front to the back, the gas turbine engine comprising:
a compressor section configured to output a compressed gas;
a combustor section configured to receive the compressed gas and fuel, mix the compressed gas and the fuel into a mixture, and to ignite the mixture to generate exhaust; and
a turbine section configured to convert the exhaust into torque to drive the compressor section, the turbine section including a vane assembly having:
a vane, and
a platform coupled to the vane, configured to support the vane, and having:
a leading edge configured to face towards the front of the gas turbine engine,
a trailing edge opposite the leading edge,
a radially outer surface that defines a pocket for receiving a cooling airflow,
a cover coupled to the radially outer surface to at least partially enclose the pocket and defining a plurality of air inlet holes configured to port at least a portion of the cooling airflow into the pocket, and
a forward hook and an aft hook that is located closer to the back of the gas turbine engine than the forward hook, the forward hook and the aft hook configured to interface with case hooks of a case of the gas turbine engine, wherein the pocket is located forward of the forward hook.

18. The gas turbine engine of claim 17, wherein:
the platform further includes a first circumferential edge and a second circumferential edge opposite the first circumferential edge;
the cover extends in a direction from the first circumferential edge to the second circumferential edge;
the platform further defines a plurality of air exit holes configured to port the at least the portion of the cooling airflow out of the pocket;
the plurality of air exit holes includes a first air exit hole and a second air exit hole that is located nearer to the first circumferential edge than the first air exit hole; and
the plurality of air inlet holes are located between the first air exit hole and the second air exit hole.

* * * * *